United States Patent
Kass

[11] 3,751,003
[45] Aug. 7, 1973

[54] FLUID VALVE
[75] Inventor: Gerald H. Kass, Garden City, Mich.
[73] Assignee: Anderson Brass Company, Detroit, Mich.
[22] Filed: Sept. 24, 1971
[21] Appl. No.: 183,355

[52] U.S. Cl. ............. 251/312, 251/184, 251/297
[51] Int. Cl. ............................................. F16k 5/04
[58] Field of Search ............... 137/543; 251/181, 251/183, 184, 297, 312

[56] References Cited
UNITED STATES PATENTS

| | | | |
|---|---|---|---|
| 3,360,236 | 12/1967 | Hulslander | 251/312 X |
| 3,443,591 | 5/1969 | Blanzy | 251/297 X |
| 3,602,340 | 8/1971 | Budzich | 251/297 X |
| 3,587,632 | 6/1971 | Clay | 137/543 |
| 3,306,572 | 2/1967 | Dove | 251/297 |
| 3,350,057 | 10/1967 | Luckenbill | 251/312 |
| 2,925,245 | 2/1960 | Lucas | 251/312 X |

Primary Examiner—Harold W. Weakley
Attorney—Harness, Dickey & Pierce

[57] ABSTRACT

The present disclosure relates to a fluid valve having a valve actuating stem extending from an opening in the valve housing, and specifically a novel cap structure for closing and sealing said opening around said stem, said structure utilizing an annular resilient sealing element for both sealing and retaining said cap structure. There is also disclosed a novel method of assembling a fluid valve incorporating said cap structure.

11 Claims, 3 Drawing Figures

PATENTED AUG 7 1973 3,751,003
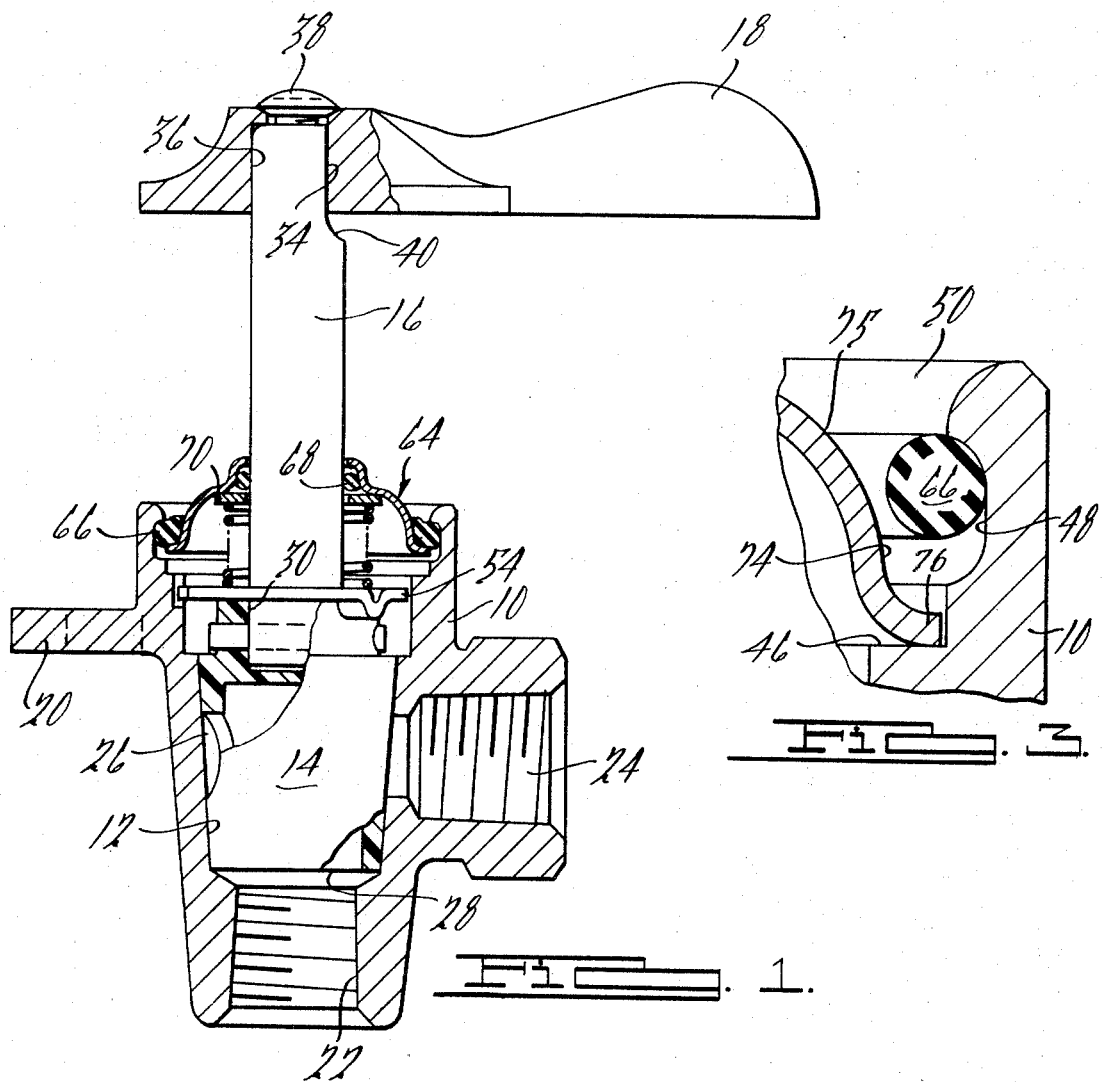
FIG. 1.
FIG. 3.
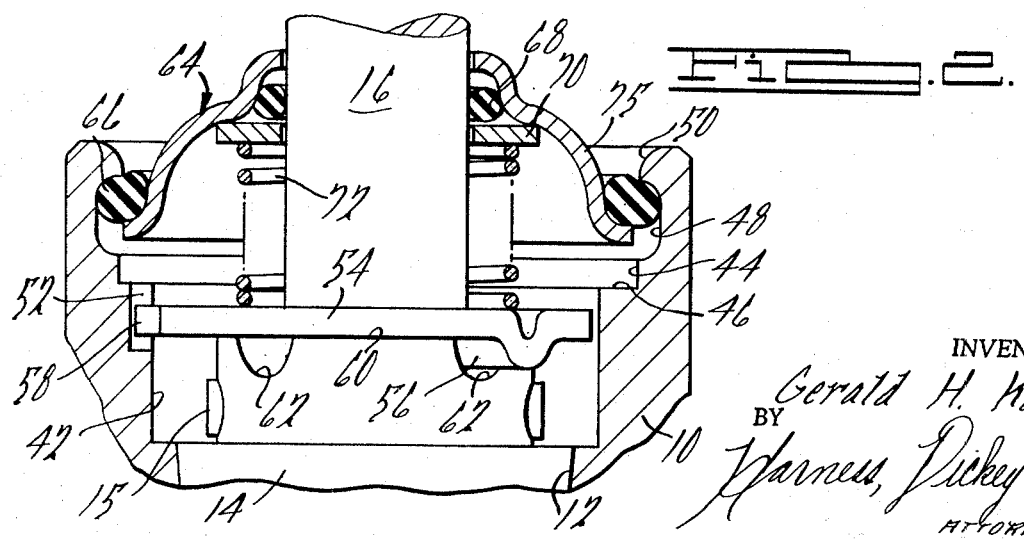
FIG. 2.
INVENTOR.
Gerald H. Kass.
BY Harness, Dickey & Pierce
ATTORNEYS

FLUID VALVE

BACKGROUND OF THE INVENTION

Tapered plug valves, as well as many other conventional valves, have a rotatable or movable valve element to which is connected an actuating stem, the latter extending through an opening in the valve housing to provide means outside the housing for actuating the valve. The stem is conventionally sealingly retained in the housing opening by means of a cap structure which threadably engages the housing, and which seals with respect to the stem and housing, respectively, by means of a pair of O-rings. One disadvantage of this arrangement is that both the housing and cap require relatively expensive threading operations during fabrication, and assembly requires that the parts first be accurately aligned (to avoid striPping the threads) and then threaded together to a predetermined extent. In addition, the presence of threads on the body also sometimes complicates slotting operations during fabrication, in cases where "stop" or "click" washers are used which require slots in the housing to prevent relative rotation.

It is therefore a primary object of the present invention to provide a fluid valve having an improved cap structure which avoids the aforementioned disadvantages found in conventional constructions. Related objects reside in the provision of such a structure which greatly facilitates assembly of the valve, and in an improved method of assembly.

Another object of the present invention resides in the provision of a fluid valve which is relatively simple and inexpensive in construction and assembly. A related object concerns the provision of such a valve which utilizes a relatively inexpensive stamped part in lieu of more costly machined parts.

Other objects, features and advantages of the present invention will become apparent from the following description and the appended claims, taken in conjunction with the accompanying drawings.

BRIEF DESCRIPTION OF THE DRAWINGS

FIG. 1 is a sectional view of a fully assembled fluid valve embodying the principals of the present invention;

FIG. 2 is an enlarged sectional view of a portion of the fluid valve shown in FIG. 1; and FIG. 3 is a further enlarged sectional view showing a portion of the valve during assembly.

DETAILED DESCRIPTION OF THE PREFERRED EMBODIMENT

Referring more specifically to the drawings, there is illustrated a fluid valve which for exemplary purposes is shown as a rotary plug valve of the general type commonly used to control the flow of both liquids and gases. It comprises a body 10 having a generally conical valve chamber 12 therein in which is rotatably disposed a conventional generally hollow valve plug or element 14 operatively connected by means of a transversely extending pin 15 to an actuating stem 16 to which is non-rotatably secured a handle 18. Body 10 is also provided with a suitable mounting flange 20 of standard configuration. Communicating with chamber 12 is a conventional tapped inlet passageway 22 and a conventional tapped outlet passageway 24. Valve element 14 is provided with one or more ports 26 in accordance with well known principles of the art whereby the flow of fluid from passageway 22 through chamber 12 to passageway 24 may be controlled. The end of element 14 is hollow or open, as shown at 28, so that port 26 is always in communication with the fluid in passageway 22. If desired, the functions of passageways 22 and 24 can be reversed so that fluid flow through the valve is in the opposite direction. Also, additional passageways similar to but spaced from passageway 24 may be provided, along with appropriate changes in the plug porting to accomplish selector valve functions, all in accordance with known practices.

The inner end of stem 16 is disposed within a bore 30 in the closed end of element 14 and, as already noted, is non-rotatably fixed to the latter by means of a transversely extending pin 15 extending through both. The outer end of stem 16 is provided with a flat portion 34 defining a D-shaped cross section which fits snugly within a correspondingly shaped bore 36 in handle 18, thus providing a non-rotatable connection. Handle 18 is held in place on stem 16 by means of a threaded fastener 38 threadably engaging the end of stem 16. For reasons which will become apparent, flat 34 is formed so that it merges gradually with the outside surface of stem 16, as by a surface of gentle arcuate configuration such as indicated at 40.

Body 10 is provided with an opening communicating with the upper end of chamber 12 as shown, through which opening stem 16 extends. This opening comprises a first cylindrical bore portion 42 having a diameter slightly greater than the major diameter of chamber 12 and being concentric therewith, and a second entrant bore portion 44 of slightly larger diameter extending to the end of the body, an annular shoulder 46 being disposed between these portions. Bore portion 44 is provided intermediate its ends with an annular groove 48, and at its junction with body 10 with a chamfered portion 50. Bore portion 42 is provided with an axially extending radial notch or groove 52 which extends up to annular surface 46. Groove 52 is relatively short in a circumferential direction.

Disposed about stem 16 is an annular washer 54 having an axially extending projection 56 on one face thereof and a relatively short radial projection 58 on the periphery thereof. Washer 54 abuts the flat upper surface of element 14, shown at 60, with projection 56 adapted to be normally disposed in one or more notches 62 in end surface 60 of element 14. Projection 58 is disposed within groove 52 and is of a circumferential length just slightly less than that of the groove so that washer 54 will not rotate with respect to body 10. Also disposed about stem 16 is an annular cap member 64, which can be an inexpensive stamped part. The outer periphery of cap member 64 sealingly engages and is retained within bore portion 44 by means of a generally annular resilient sealing O-ring element 66 disposed within groove 48, shown in its relaxed toroidal shape in FIG. 3, and compressed in FIGS. 1 and 2. The inner periphery of cap member 64 is sealed with respect to stem 16 by means of another annular resilient sealing member 68. Also surrounding stem 16, inside cap member 64, is a conventional washer 70. Between washer 54 and washer 70 there is provided a compression spring 72 which operates to bias washer 70 outwardly and to bias washer 54 inwardly. The outward bias on washer 70 urges cap member 64 outwardly to assist sealing element 66 in providing seal between body 10 and cap member 64. The inward bias on washer 54 tends to resiliently urge valve element 14 into proper sealing engagement with the walls of chamber 12, and projection 56 into one of notches 62 to maintain valve element 14 in the rotational position dictated by the position of the notch. Thus, rotation of stem 16 will cause valve element 14 to rotate which in turn will cause projection 56 to be cammed out of its notch 62 against the bias of spring 72. Continued rotation will result in projection 56 snapping with an audible "click" into the next notch 62. The positioning of notches 62 to provide discrete audible positions of the valve is done in accordance with conventional practices in the art. Washer 54 and its function are not necessary to the invention, however, and may be omitted in any given design, in which case spring 72 will abut either the end of element 14 or a plain washer inserted in place of washer 54.

The contributions to the art made by the present invention reside primarily in the manner in which the body is sealed by cap member 64 and the manner in which cap member 64 is retained in position, as well as the simplified method of assembly which is facilitated thereby. The advantages of the present invention are accomplished by providing cap member 64 with an outside diameter which is just slightly less than the inside diameter of bore portion 44 (minimum practical clearance) and by further providing cap member 64 with a bulged partly toroidal intermediate section providing in effect an outwardly facing shoulder having a first surface 74 disposed adjacent the outer periphery of cap member 64 and generally facing entrant bore portion 44 and an inwardly inclined second surface 75 disposed axially outwardly from first surface 74 and extending radially inwardly therefrom, as best seen in FIG. 3. Groove 48 is of a depth less than the cross-sectional width (in a transverse plane) of element 66, and preferably slightly less than one-half the width thereof, as best seen in FIG. 3 (note that the outside diameter of the out-turned generally planar rim portion 76 of cap member 64 is slightly greater than the mean diameter of element 66, i.e. the diameter of the loci of centers of the cross section of the tore constituting the annular element, which is the diameter midway between the inside and outside diameters of a conventional O-ring of circular cross section). The space between surface 74 and the bottom of groove 48 is preferably approximately equal to the relaxed width of the cross section of element 66. Surface 75 is such that when cap member 64 is pushed inwardly to a point where the rim 76 engages surface 46, sufficient space will be created between cap member 64 and bore portion 42 to pass element 66 in a generally relaxed state, as shown in FIG. 3. Groove 48 may be provided with arcuate ends in cross section to increase effective sealing area, and should be of a sufficient width to accommodate swelling of element 66 under the influence of certain fluids. The portion of cap member 64 disposed between surface 74 and the rim 76 may also be formed with an arcuate cross section to increase sealing area, as shown in FIGS. 1 and 2 in which element 66 is sealingly disposed between the cap member and body. Because of the relative dimensions of the respective parts, it will be appreciated that once fully assembled (FIG. 1), cap member 64 is mechanically restrained by element 66 and cannot be forced out of the body without shearing or extruding element 66. In practice it has been found that when a conventional O-ring is used as element 66, cap member 64 is capable of withstanding required maximum test pressures for many types of valves.

Assembly of the valve may thus be accomplished in the following manner. The plug and stem assembly may be inserted through the open end of body 10 into chamber 12 to the position shown. At this point, or prior to such insertion, there may be placed on stem 16, washer 54, spring 72, washer 70, resilient sealing element 68 and cap member 64, in that order. Arcuate surface 40 on the stem facilitates sliding element 68 over the stem with a minimum of resistance and chance of damage. Assembly of the valve itself may thereafter be completed by simply pushing cap member 64 toward body member 10 against the influence of spring 72 until the outer periphery of cap 64 engages shoulder 46, as shown in FIG. 3. Because of the radially inwardly tapered configuration of surface 75 there is at this point sufficient clearance between body 10 and cap 64 to insert resilient sealing member 66 into groove 48, whereupon cap member 64 may be released and spring 72 will cause the outer periphery of the cap member to bear against resilient member 66 in the manner shown in FIG. 2. Chamfered portion 50 facilitates insertion of element 66. Because of the relationship of the parts element 66 will prevent further outward movement of the cap member and in addition will provide a seal between the cap member and the body. Handle 18 may then be fixed to stem 16 by means of threaded fastener 38. Because the cap member engages element 66 not only in an axial direction but also in a radial direction, element 66 will also permit the cap member to float sideways slightly with stem 16 to absorb side thrusts thereon, with a reduced probability of stem leakage. The cap member cannot now be wilfully removed without first removing element 66, and the latter cannot be removed without first pushing the cap member in and using a pointed tool to work it out of groove 48.

I claim:

1. Fluid valve means comprising: body means defining a valve chamber; means defining an access opening in said body means communicating with said chamber; inlet and outlet passageways through said body means communicating with said chamber; a valve element in said chamber movable to a plurality of positions to control the flow of fluid from said inlet passageway to said outlet passageway; characterized by the combination of closure means for sealingly closing said opening; a resilient O-ring disposed between said closure means and said body means, said O-ring preventing movement of said closure means away from said body means and providing a fluid seal between said body means and said closure means; and spring means for biasing said closure means toward said O-ring.

2. Fluid valve means as claimed in claim 1, further comprising means defining an annular groove in said opening, said O-ring being disposed partly in said opening and partly in said groove, the outside diameter of said closure means including a rim portion underlying the O-ring on the same side thereof as the spring and being of greater diameter than the inside diameter of said O-ring whereby the O-ring acts as a retaining ring and establishes the seal between the body and the closure means in the area of said rim.

3. Fluid valve means as claimed in claim 2, further comprising means defining a shoulder on said closure means having a first surface adjacent said rim and generally facing the wall of said opening and spaced from said wall a distance so porportioned to the cross section of the torus of the O-ring that the O-ring is confined radially between said first surface and said wall and is confined axially between said rim portion and a part of the groove, and a second surface disposed axially outwardly from said first surface and extending radially inwardly therefrom.

4. Fluid valve means as claimed in claim 1, wherein said O-ring constitutes the sole means for retaining said closure means in said opening.

5. Fluid valve means as claimed in claim 2, wherein the outside diameter of said closure means is slightly greater than the mean diameter of said O-ring.

6. Fluid valve means as claimed in claim 3, wherein said closure member and said groove each have an annular concave portion which is of substantially partly toroidal configuration, said portions adapted to face one another in diagonally opposed relation with said O-ring disposed therebetween.

7. Fluid valve means as claimed in claim 6, wherein said portions are of a curvature corresponding to that of the surface of said O-ring engaged thereby.

8. Fluid valve means comprising: body means defining a valve chamber and having an access passage therethrough communicating with said chamber; inlet and outlet passageways through said body means communicating with said chamber; a valve element in said chamber movable to a plurality of positions to control the flow of fluid from said inlet passageway to said outlet passageway; actuating means connected to said valve element and including a stem extending through said passage to a point outside said body means to facilitate actuation of said valve element; separate closure means surrounding said stem; characterized by a resilient annular member disposed between said closure means and said body means, and wherein said member acts both to prevent movement of said closure means away from said body means and to provide a fluid seal between said body means and said closure means.

9. Fluid valve means as claimed in claim 8, further comprising means defining an annular groove in said passage, said member adapted to be disposed in part therein.

10. Valve means as defined in claim 8 wherein said closure means is fitted into the access passage with substantial radial clearance and is radially confined by the resilient annular member whereby limited radial movement of the closure means and stem can be accommodated by flexure of said member.

11. Fluid valve means comprising: body means defining a valve chamber; means defining an access passage through said body means communicating with said chamber, said passage having a cylindrical entrant portion at its juncture with the outside surface of said body means; inlet and outlet passageways through said body means communicating with said chamber; a valve device in said chamber movable to a plurality of positions to control the flow of fluid from said inlet passageway to said outlet passageway; actuating means connected to said valve device and including a stem extending through said passage to a point outside said body means to facilitate actuation of said valve device; a separate annular closure element surrounding said stem, said element having a cylindrical outer periphery just slightly less in diameter than the diameter of said entrant portion and being generally coaxial therewith; means providing a seal between the inner periphery of said element and said stem; means defining a shoulder on said element having a first surface generally facing said entrant portion and a second surface disposed axially outwardly from said first surface and extending radially inwardly therefrom; means defining an annular groove in said entrant portion; an elastomeric annular member disposed in said groove, said second surface being such that when said element is displaced axially inwardly past said groove there will be defined an annular space between said element and said entrant portion sufficient in width to pass said member; and spring means for biasing said element axially outwardly, said groove being of a depth less than the corresponding cross sectional width of said member, said first-mentioned width being greater than said depth plus the clearance between the outer periphery of said element and said entrant portion, and said first surface being radially spaced from the bottom of said groove a distance generally the equal to said cross-sectional width of said elastomeric member.

\* \* \* \* \*